Feb. 27, 1940.                F. KUHN ET AL                2,191,670
                                THERMOSTAT
                             Filed June 13, 1938
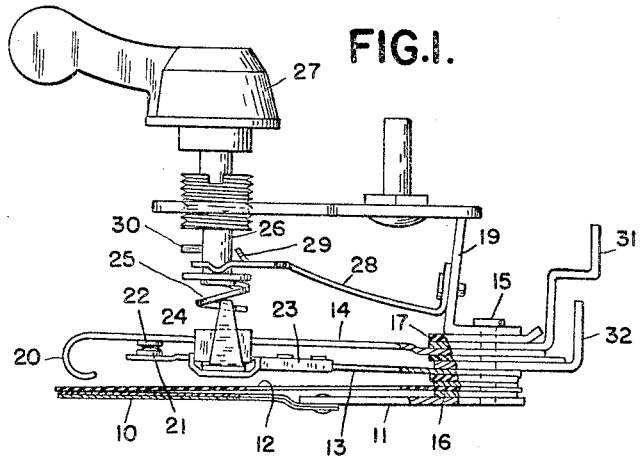
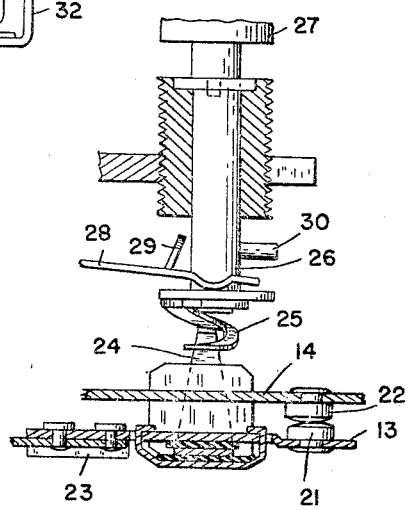
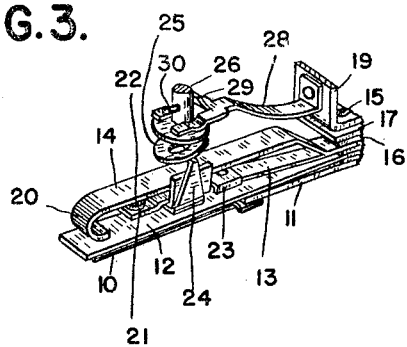
INVENTORS
FRANK KUHN
LAURENCE H. THOMAS
BY
Whittemore Hulbert + Belknap
ATTORNEYS Patented Feb. 27, 1940

2,191,670

UNITED STATES PATENT OFFICE 2,191,670

THERMOSTAT

Frank Kuhn, Detroit, and Laurence H. Thomas, Birmingham, Mich., assignors to American Electrical Heater Company, Detroit, Mich., a corporation of Michigan Application June 13, 1938, Serial No. 213,522

2 Claims. (Cl. 200—138)

The invention relates to thermostatically controlled electric switches and is an improvement on the constructions shown in our prior Patents Nos. 2,070,604 and 2,071,209, both issued February 16, 1937.

While the invention is adapted to be used in controlling the temperature of various electrical heating devices, it is particularly adapted for automatically controlling the temperature of electrically heated laundry irons as illustrated in Patent No. 2,070,604.

Thermostat devices of the types illustrated in the patent above referred to are adapted to controlling the working temperature of an electric laundry iron within close limits, and this is accomplished by the make and break method whereby the electric current is turned on and off as required to maintain the proper temperature.

In the construction of thermostatic devices in accordance with the prior patents, it sometimes happens that the electric contacts are caused to operate at very frequent intervals and, while this accurately maintains a predetermined temperature, there are certain disadvantages in having too frequent fluctuations of the electric current. One of these disadvantages is that each time the current is turned on or off there is produced a certain amount of static which affects other electrical apparatus, such as radios. It is therefore one of the objects of the present invention to provide a thermostatic device of the same general type as the above mentioned prior patents, but which is so constructed that it will cause less frequent making and breaking of the current. At the same time, the construction is so designed that it will maintain the temperature of the device which it controls within close limits.

Other objects of the invention reside in improved features of construction whereby the device may be accurately and economically manufactured and installed.

In the drawing:

Figure 1 is a longitudinal section through a thermostatic switch made in accordance with the invention;

Figure 2 is an enlarged cross section thereof;

Figure 3 is a perspective view.

10 is a bimetallic thermostatic bar which, as shown, is riveted to a heavier metal bar 11. This bar has directly thereabove an insulating strip 12, preferably of mica, above which are arranged the spring metal strips 13 and 14. All of these strips and bars are assembled together at one end by means of the rivet 15 and a series of spacers 16 and insulating members 17. The rivet 15 also unites the strips to a bracket member 19 of substantially Z-shaped form which is adapted to be secured to a laundry iron, or other suitable appliance, in such a manner as to mount the assembly with the thermostatic bar 10 adjacent the bottom portion of the iron in the same manner as illustrated in Patent No. 2,071,209.

The spring metal strip 14 is biased so that the free end thereof tends to move toward the thermostatic bar 10 but is held in spaced relation thereto by the return-bent portion 20 of the strip 14. The spring strip 13 is biased in the opposite direction so that it tends to move away from the thermostatic bar 10 and towards the spring strip 14. Both the spring strips 13 and 14 are made of relatively thin gauge metal of a type suitable to maintain its resiliency at elevated temperatures such as are obtained in an electric laundry iron. Contact points 21 and 22 are secured to the respective strips 13 and 14 and are in registration with one another. Intermediate spring strip 13 has secured thereto the channel-shaped member 23 adjacent the contact 21 in order to increase the rigidity of the spring strip at this point and to permit the upright finger 24 to be rigidly secured to the spring strip.

The finger 24 cooperates with a cam 25 which, as shown, is a spiral strip, the upper end of which is connected to an adjusting shaft 26 and handle 27. An arm 28 secured to the bracket 19 extends over the cam 25 and has a struck-up lug 29 forming a stop for engagement with a pin 30 on the shaft 26.

The electric current is conducted to the thermostat through suitable terminal posts 31 and 32, the former being clamped in contact with the spring strip 14, and the latter being clamped in contact with the spring strip 13. These parts are insulated from each other and from the thermostatic bar by mica strips 17 previously described.

In the operation of the device, the intermediate spring strip 13 urges the contact 21 into engagement with the contact 22, thus completing the circuit through the electrical resistor of the laundry iron. As the temperature increases, the thermostatic bar 10 warps upwardly until it engages the return-bent portion 20 of the spring strip 14. As the temperature still further increases, the spring 14 and its contact 22 are moved upwardly together, and the contact 21 tends to follow the movement of the other parts and maintains the circuit closed, but is prevented from so doing by the finger 24 which engages the cam 25. Therefore an increase in temperature moves the contact 22 away from the contact 21 and breaks the circuit.

The operation of the device, as above described, is similar to the operation of the construction shown in Patent No. 2,071,209. In the prior patent, however, the spring strip corresponding to the element 14 has its outer end bent downwardly and outwardly for engagement with the thermostatic bar, but in the improved construction of the present invention the spring 14 has its outer end shaped into a reverse bend as illustrated. This changes the flexing of the spring strip 14 in such a way as to slightly increase the rigidity at the outer end of the spring strip. It has been found that the present construction functions to cause a more positive breaking and making of the circuit under the influence of the thermostatic bar 10. It has been found that the provision of the return-bent portion 20 in a thermostatic construction causes it to make and break on an average of once every three minutes, whereas the identical construction without the return-bent portion would average a make and break as high as ten times every minute.

Our improved construction makes it possible to employ thin flexible spring strips 14 and 13 which require very little effort to actuate them and therefore can be moved by a thermostatic bar of relatively small size. It is, therefore, a distinct improvement on the constructions of our prior patents.

What we claim as our invention is:

1. A thermostatic switch comprising a thermostatic bar supported at one end, a resilient member supported at the same end as said bar biased to move towards said bar, an intermediate resilient member supported at the same end and biased to move away from said bar towards said first resilient member, cooperating contacts on said first and intermediate resilient members, a stop for engaging said intermediate member and a return-bent strip extending from the free end of said first resilient member towards said thermostatic bar for engaging the latter.

2. A thermostatic switch comprising a thermostatic bar supported at one end, a resilient strip supported at the same end and having a return-bent outer end engaging said bar, said strip being biased to move towards said bar, an intermediate member supported at the same end and biased to move away from said bar and towards said first resilient strip, cooperating contacts on said resilient strips and a stop for engaging said intermediate strip.

FRANK KUHN.
LAURENCE H. THOMAS.